United States Patent

Roberts

(10) Patent No.: US 10,649,843 B2
(45) Date of Patent: May 12, 2020

(54) STORAGE SYSTEMS WITH PEER DATA SCRUB

(71) Applicant: Western Digital Technologies, Inc., San Jose, CA (US)

(72) Inventor: Adam Roberts, Moncure, NC (US)

(73) Assignee: Western Digital Technologies, Inc., San Jose, CA (US)

( * ) Notice: Subject to any disclaimer, the term of this patent is extended or adjusted under 35 U.S.C. 154(b) by 84 days.

(21) Appl. No.: 16/054,940

(22) Filed: Aug. 3, 2018

(65) Prior Publication Data

US 2020/0042380 A1    Feb. 6, 2020

(51) Int. Cl.
*G06F 11/10* (2006.01)
*G06F 11/07* (2006.01)
(Continued)

(52) U.S. Cl.
CPC .......... *G06F 11/106* (2013.01); *G06F 3/0614* (2013.01); *G06F 3/0653* (2013.01); *G06F 3/0689* (2013.01); *G06F 11/0766* (2013.01); *G06F 11/1092* (2013.01); *H04L 67/104* (2013.01); *G06F 2211/1028* (2013.01); *G06F 2211/1088* (2013.01)

(58) Field of Classification Search
CPC .... G06F 11/106; G06F 3/0614; G06F 3/0653; G06F 3/0689; G06F 11/0766; G06F 11/1092; G06F 2211/1028; G06F 2211/1088; H04L 67/104
USPC .... 714/764, 769, 770, 773, 6.23, 48, 52, 54, 714/57
See application file for complete search history.

(56) References Cited

U.S. PATENT DOCUMENTS 5,530,948 A    6/1996  Islam
5,680,539 A   10/1997  Jones
(Continued)

FOREIGN PATENT DOCUMENTS

EP    2626780 B1    11/2019
WO    2014110095 A1    7/2014
WO    2015116197 A1    8/2015

OTHER PUBLICATIONS

IP.com, Peer-to-Peer Hard Disk Drive, Apr. 24, 2006, IP.com, pp. 1-3. (Year: 2006).*
(Continued)

*Primary Examiner* — John J Tabone, Jr.
(74) *Attorney, Agent, or Firm* — Patent Law Works LLP

(57) ABSTRACT

Example peer storage systems, storage devices, and methods provide data scrub using a peer communication channel. Peer storage devices establish peer communication channels that communicate data among the peer storage devices. A storage device may identify data segments from their storage medium for a data scrub process. A peer storage device may be identified that contains corresponding data segments to the data segment being scrubbed. A corresponding lock command may be sent over the peer communication channel to lock the corresponding data segments during the data scrub process. A data scrub error report may be generated from the data scrub process. If an error is discovered during the data scrub process the storage device may use the peer communication channel to retrieve recovery data from peer storage devices to rebuild the data segment with the error.

20 Claims, 5 Drawing Sheets

(51) Int. Cl.
*G06F 3/06* (2006.01)
*H04L 29/08* (2006.01)

(56) References Cited

U.S. PATENT DOCUMENTS

| | | | |
|---|---|---|---|
| 5,742,752 A | 4/1998 | DeKoning | |
| 6,092,215 A | 7/2000 | Hodges et al. | |
| 6,738,937 B1* | 5/2004 | Bergsten | G06F 11/261 |
| | | | 714/45 |
| 7,434,107 B2 | 10/2008 | Marks | |
| 7,454,655 B2 | 11/2008 | Werner et al. | |
| 7,571,344 B2 | 8/2009 | Hughes et al. | |
| 7,620,841 B2 | 11/2009 | Chen et al. | |
| 7,680,837 B2 | 3/2010 | Yamato | |
| 7,783,600 B1 | 8/2010 | Spertus et al. | |
| 7,934,055 B2 | 4/2011 | Flynn et al. | |
| 7,984,328 B1 | 7/2011 | Coatney | |
| 8,086,911 B1 | 12/2011 | Taylor | |
| 8,289,641 B1 | 10/2012 | Emami | |
| 8,473,648 B2 | 6/2013 | Chakhaiyar et al. | |
| 8,583,853 B1 | 11/2013 | Lee et al. | |
| 8,838,931 B1 | 9/2014 | Marshak et al. | |
| 9,116,624 B2* | 8/2015 | Canepa | G06F 3/0683 |
| 9,118,698 B1 | 8/2015 | Radovanovic | |
| 9,122,587 B2 | 9/2015 | Baryudin et al. | |
| 9,417,821 B2 | 8/2016 | Slaight et al. | |
| 9,448,924 B2 | 9/2016 | Sundaram et al. | |
| 9,720,601 B2 | 8/2017 | Gupta et al. | |
| 9,785,480 B2 | 10/2017 | Kamawat et al. | |
| 9,894,141 B2 | 2/2018 | Hesselink et al. | |
| 9,971,515 B2 | 5/2018 | Chang et al. | |
| 10,042,721 B2 | 8/2018 | Condict et al. | |
| 10,289,507 B1 | 5/2019 | Malwankar et al. | |
| 10,379,948 B2 | 8/2019 | O'krafka | |
| 10,394,634 B2* | 8/2019 | Chagam Reddy | G06F 11/0751 |
| 10,409,769 B1 | 9/2019 | Malhotra et al. | |
| 10,474,528 B2 | 11/2019 | Bolkhovitin et al. | |
| 2002/0162075 A1 | 10/2002 | Talagala et al. | |
| 2005/0028048 A1 | 2/2005 | New et al. | |
| 2005/0114448 A1 | 5/2005 | Skomra | |
| 2005/0114726 A1 | 5/2005 | Ouchi | |
| 2006/0031722 A1* | 2/2006 | Kolvick, Jr. | G06F 11/1076 |
| | | | 714/52 |
| 2006/0123142 A1 | 6/2006 | Duncan et al. | |
| 2007/0226413 A1* | 9/2007 | Elliott | G06F 3/0617 |
| | | | 711/114 |
| 2007/0245082 A1 | 10/2007 | Margolus et al. | |
| 2008/0005382 A1 | 1/2008 | Mimatsu | |
| 2008/0034153 A1 | 2/2008 | Lee et al. | |
| 2008/0250057 A1* | 10/2008 | Rothstein | G06F 16/20 |
| 2009/0070539 A1* | 3/2009 | Haustein | G06F 11/1435 |
| | | | 711/162 |
| 2009/0132760 A1 | 5/2009 | Flynn et al. | |
| 2009/0150605 A1 | 6/2009 | Flynn et al. | |
| 2009/0307426 A1 | 12/2009 | Galloway et al. | |
| 2010/0251073 A1 | 9/2010 | Stolowitz | |
| 2011/0029711 A1 | 2/2011 | Dhuse et al. | |
| 2011/0093742 A1 | 4/2011 | Shinozaki | |
| 2012/0011200 A1 | 1/2012 | Zhang et al. | |
| 2012/0079317 A1 | 3/2012 | Nelogal et al. | |
| 2012/0179869 A1 | 7/2012 | Flynn et al. | |
| 2012/0284460 A1 | 11/2012 | Guda | |
| 2013/0073894 A1 | 3/2013 | Xavier et al. | |
| 2013/0179753 A1 | 7/2013 | Flynn et al. | |
| 2014/0012906 A1* | 1/2014 | Teja | H04L 67/104 |
| | | | 709/204 |
| 2014/0101369 A1 | 4/2014 | Tomlin et al. | |
| 2014/0181041 A1* | 6/2014 | Whitehead | G06F 11/1448 |
| | | | 707/652 |
| 2014/0181575 A1 | 6/2014 | Kalach et al. | |
| 2014/0237298 A1 | 8/2014 | Pe'er | |
| 2014/0258598 A1 | 9/2014 | Canepa et al. | |
| 2014/0365719 A1 | 12/2014 | Kuzmin et al. | |
| 2014/0379671 A1* | 12/2014 | Barrus | G06F 11/1076 |
| | | | 707/692 |
| 2015/0067244 A1 | 3/2015 | Kruger | |
| 2015/0205668 A1 | 7/2015 | Sundaram et al. | |
| 2016/0070652 A1 | 3/2016 | Sundararaman et al. | |
| 2016/0234172 A1* | 8/2016 | Agarwal | H04L 63/0428 |
| 2016/0335208 A1 | 11/2016 | Slaight et al. | |
| 2017/0116074 A1 | 4/2017 | Hayes et al. | |
| 2017/0242744 A1* | 8/2017 | Wang | G06F 11/0727 |
| 2017/0270018 A1 | 9/2017 | Xiao et al. | |
| 2017/0286237 A1 | 10/2017 | Condict et al. | |
| 2018/0018231 A1 | 1/2018 | Okada et al. | |
| 2018/0024964 A1 | 1/2018 | Mao et al. | |
| 2018/0032446 A1 | 2/2018 | Amarendran et al. | |
| 2018/0054217 A1 | 2/2018 | Schwaderer | |
| 2018/0101450 A1* | 4/2018 | Park | G06F 11/1469 |
| 2018/0137004 A1* | 5/2018 | Gao | G06F 11/0793 |
| 2018/0341548 A1 | 11/2018 | Bolkhovitin et al. | |
| 2018/0341606 A1* | 11/2018 | Bolkhovitin | G06F 3/061 |
| 2018/0357019 A1* | 12/2018 | Karr | G06F 3/0685 |
| 2019/0102249 A1 | 4/2019 | Bolkhovitin et al. | |
| 2019/0102250 A1 | 4/2019 | O'Krafka et al. | |
| 2019/0243703 A1* | 8/2019 | Rooney | G06F 11/2082 |

OTHER PUBLICATIONS

Amvrosiadis et al., Practical Scrubbing: Getting to the bad sector at the right time, 2012, IEEE, pp. 1-12. (Year: 2012).*
A Survey of Peer-to-Peer Storage Techniques for Distributed File Systems, ITCC '05 Proceedings of the International Conference on Information Technology: Coding and Computing (ITCC'05)—vol. 02, Apr. 4, 2005, 9 pages.
Donard: NVM Express for Peer-2-Peer between SSDs and other PCIe Devices, Storage Developer Conference, SNIA Santa Clara, 2015, 18 pages.
Drobo creator announces Transporter, the private cloud storage solution, May 28, 2013, <https://www.bit-tech.net/news/transporter-private-cloud-storage-drobo-cre/1/>, 2 pages.
SCSI Sense Key Error Guide, Sun Microsystems, Inc., Part No. 817-5918-10, Feb. 2004, Revision A, 16 pages.
About the IBM Cloud Storage API. Sep. 28, 2018. https://console.bluemix.net/docs/services/cloud-object-storage/api-reference/about-api.html#about-the-ibm-cloud-object-storage-api.
Ahluwalia, G., United States, White Paper. Event Stream Processor as seen by SAP, An evolution of event driven architecture, pp. 1-11.
Bulk Delete. OpenStack Docs: OpenStack Security Guide, docs.openstack.org/ocata/user-guide/cli-swift-bulk-delete.html.
Hightower, R., et al., Analytics with Apache Spark Tutorial Part 2: Spark SQL—DZone Big Data, Dzone.com, Nov. 3, 2015, dzone.com/articles/analytics-with-apache-spark-tutorial-part-2-spark.
Moatti, Yosef & Rom, et al., 2017, Too Big to Eat: Boosting Analytics Data Ingestion from Object Stores with Scoop, https://www.researchgate.net/.
Object Operations. Sep. 28, 2018, https://console.bluemix.net/docs/services/cloud-object-storage/api-reference/api-reference-objects.html#object-operations.
Using Oracle Cloud Infrastructure Object Storage Classic, Deleting Multiple Objects in a Single Operation, Mar. 28 2018, https://docs.oracle.com/en/cloud/iaas/storage-cloud/cssto/deleting-multiple-objects-single-operation.html.
Wikipedia, The Free Encyclopedia, "Key Code Qualifier," retrieved Jul. 10, 2018, <https://en.wikipedia.org/wiki/Key_Code_Qualifier>, 8 pages.
Zhang, Jiacheng, et al., ParaFS: A Log-Structured File System to Exploit the Internal Parallelism of Flahs Devices, USENIX Annual Technical Conference, Jun. 22-24, 2016, 15 pages.
International Search Report and Written Opinion of Internationals Application No. PCT/US2018/062498, dated Mar. 12, 2019, 20 pages.
International Search Report and Written Opinion of Internationals Application No. PCT/US2019/035060, dated Sep. 16, 2019, 8 pages.
International Search Report and Written Opinion of Internationals Application No. PCT/US2019/035085, dated Sep. 18, 2019, 8 pages.

(56) References Cited

OTHER PUBLICATIONS

International Search Report and Written Opinion of Internationals Application No. PCT/US2019/035087, dated Sep. 25, 2019, 11 pages.
International Search Report and Written Opinion of Internationals Application No. PCT/US2019/035088, dated Sep. 26, 2019, 10 pages.
International Search Report and Written Opinion of Application No. PCT/US2019/063104, dated Jan. 23, 2020, 11 pages.
Xiang, Liping, et al., Optimal Recovery of Single Disk Failure in RDP Code Storage Systems, Jun. 18, 2010, http://citeseerx.ist.psu.edu/viewdock/download?doi=10.1.1.331.4168&rep=rep1&type=pdf.

* cited by examiner

STORAGE SYSTEMS WITH PEER DATA SCRUB

TECHNICAL FIELD

The present disclosure generally relates to data storage systems, and in a more particular example, to data storage systems with peer-to-peer operations.

BACKGROUND

Multi-device storage systems utilize multiple discrete storage devices, generally disk drives (solid-state drives, hard disk drives, hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

Some multi-device storage systems employ storage devices capable of communicating with one another over the interconnecting fabric and/or network fabric. In some cases, these storage devices may be capable of peer-to-peer communication without the involvement of a storage control plane, such as a storage controller or host controller, as an intermediary. These peer storage devices may be capable of exchanging messages and/or transferring host data across the interconnecting fabric independent of the storage control plane. Reducing communication, data transfer, processing, and/or data management at the storage control plane may reduce bottlenecks and improve scalability as the number and capacity of storage devices increases.

Storage devices, particularly storage devices using flash memory for durable storage in transactional applications, are susceptible to data corruption over time. For example, data bits in flash memory may be corrupted by read, program, and erase sequences where memory cells in physical proximity to those that are used may be unintentionally stressed to a point where stored charge levels change enough to induce bit errors. Even with respect to read operations, read stress may influence both read and adjacent memory cells, particularly for high-volume repeated reads. While the error correction codes (ECC) used to encode the host data may enable recovery of some bit errors, corruption may exceed the capacity of ECC over time.

To combat the long-term effects of data corruption, some storage devices implement a data scrub process whereby data units are read and rewritten to enable ECC to correct accumulated errors and/or identify data units that have exceeded the capability of ECC to recover. These data scrubs may be based on a periodic schedule, read/write and/or endurance thresholds, and/or events, such as read or write errors. In some storage architectures, scheduling and management of data scrubs is managed at the storage control plane and individual storage devices respond to data management commands to initiate targeted data scrubs. Management of data scrubs at the storage control plane may create processing and scheduling bottlenecks, underutilize available compute resources at the storage devices, and reduce scalability of storage arrays.

Therefore, there still exists a need for storage architectures that enable peer-to-peer communication for data scrub offloading from the storage control plane.

SUMMARY

Various aspects for peer operations among peer storage devices, particularly, peer data scrub are described. In an innovative aspect, a storage device comprises a processor, a memory, at least one storage medium, and an interface configured to communicate with a plurality of peer storage devices over a peer communication channel. A data scrub module is stored in the memory and executable by the processor to perform operations. A first data segment on the at least one storage medium is selected for a data scrub process. At least one peer storage device including at least one corresponding data segment is identified. A corresponding data lock command is sent to the at least one peer storage device over the peer communication channel. A data scrub operation is executed on the first data segment. A data scrub error report is generated for the first data segment in response to performing the data scrub operation.

In various embodiments, the peer communication channel may bypass a storage control plane for managing the storage device. A peer device registry may be stored in the memory and comprise a peer storage device identifier for each of the plurality of peer storage devices. The peer storage device identifier may be used to address data sent over the peer communication channel. The peer data configuration may identify corresponding data segments in the plurality of peer storage devices. Identifying at least one peer storage device including at least one corresponding data segment may include accessing the peer data configuration. The peer data configuration may be a redundant array of independent disks (RAID) configuration. The first data segment may be a local portion of a RAID stripe. The at least one corresponding data segment may include at least one additional portion of the RAID stripe.

In some embodiments, the data scrub module may be further executable by the processor to perform operations comprising storing a data scrub configuration in the memory and initiating the data scrub process according to a data scrub schedule. The data scrub configuration may define a data scrub schedule and a data scrub pattern and the first data segment may be selected in response to the data scrub pattern. The data scrub configuration may be received from a data scrub manager. The data scrub manager may include one of a peer data scrub manager instantiated in a manager peer storage device selected from the plurality of peer storage devices and communicating over the peer communication channel and a controller data scrub manager instantiated in a storage control plane for the plurality of peer storage devices. The data scrub process may include a first scrub portion performed by the data scrub manager for a first plurality of data segments on the at least one storage medium and a second scrub portion performed by the data scrub module for a second plurality of data segments on the at least one storage medium. The second plurality of data segments may include the first data segment. The second scrub portion of the data scrub process may be initiated in response to receiving the data scrub configuration from the data scrub manager.

In some embodiments, a peer data segment on at least one peer storage medium may be selected for a peer data scrub process. The peer storage medium may be in a selected peer storage device from the plurality of peer storage devices. A peer data scrub operation may be performed on the peer data segment over the peer communication channel. A peer data scrub error report may be generated for the peer data segment in response to performing the peer data scrub operation. A compute resource usage value related to the processor and the memory may be monitored. The data scrub process may be scheduled in response to the compute resource usage value being below a compute resource availability threshold.

In some embodiments, a self-healing module may be stored in the memory and executable by the processor to perform operations. A failed data unit may be identified from the first data segment in response to the data scrub process. Recovery data for the failed data unit may be received from a recovery peer storage device over the peer communication channel. The failed data unit may be recovered from a first storage media segment in the at least one storage medium to a second storage media segment using the recovery data.

In another innovative aspect, a computer-implemented method for execution by a storage device provides a peer data scrub. Storage device identifiers for a plurality of peer storage devices are stored in a first storage device. A peer communication channel is established with at least one of the plurality of peer storage devices from the first storage device. The peer communication channel bypasses a storage control plane for managing the first storage device. A data scrub process is executed. A first data segment is selected in the first storage device. At least one corresponding data segment is identified in at least one corresponding peer storage device. A corresponding data lock command is sent to the at least one corresponding peer storage device over the peer communication channel. A data scrub operation is performed on the first data segment. A data scrub error report is generated for the first data segment in response to performing the data scrub operation.

In various embodiments, identifying at least one corresponding data segment may include accessing a peer redundant array of independent disks (RAID) data configuration configured to identify corresponding data segments for the first data segment in the plurality of peer storage devices. The first data segment may be a local portion of a RAID stripe stored in the first storage device. The at least one corresponding data segment may include at least one additional portion of the RAID stripe. A data scrub configuration may be stored and the data scrub configuration may define a data scrub schedule and a data scrub pattern. The data scrub process may be initiated according to the data scrub schedule. The first data segment may be selected in response to the data scrub pattern. The data scrub configuration may be received from a data scrub manager. The data scrub manager may include one of a peer data scrub manager instantiated in a manager peer storage device selected from the plurality of peer storage devices and communicating over the peer communication channel and a controller data scrub manager instantiated in a storage control plane for the plurality of peer storage devices.

In some embodiments, a peer data scrub process may be executed using the first storage device. A peer data segment may be selected on at least one peer storage medium. The peer storage medium may be in a selected peer storage device from the plurality of peer storage devices and not be the first storage device. A peer data scrub operation may be performed on the peer data segment over the peer communication channel. A peer data scrub error report may be generated for the peer data segment in response to performing the peer data scrub operation. A compute resource usage value related to at least one compute resource of the first storage device may be monitored. Scheduling the data scrub process may be in response to the compute resource usage value being below a compute resource availability threshold.

In some embodiments, a failed data unit may be identified from the first data segment in response to the data scrub process. Recovery data for the failed data unit may be received from a recovery peer storage device over the peer communication channel. The failed data unit may be recovered from a first storage media segment in the first storage device to a second storage media segment using the recovery data.

In yet another innovative aspect, a storage system comprises a plurality of peer storage devices and each storage device comprises at least one storage medium and various means. Means are provided for storing storage device identifiers for the plurality of peer storage devices. Means are provided for establishing a peer communication channel between a scrubbing peer storage device selected from the plurality of peer storage devices and a target peer storage device selected from the plurality of peer storage devices. The peer communication channel bypasses a storage control plane for managing the plurality of peer storage devices. Means are provided for the scrubbing peer storage device to select a first data segment in the target storage device. Means are provided for identifying at least one corresponding data segment in at least one corresponding peer storage device. Means are provided for sending a corresponding data lock command to the at least one corresponding peer storage device over the peer communication channel. Means are provided for the scrubbing peer storage device to perform a data scrub operation on the first data segment over the peer communication channel. Means are provided for generating a data scrub error report for the first data segment in response to performing the data scrub operation.

In various embodiments, means may be provided for managing a plurality of data scrub operations for the plurality of peer storage devices. The means for managing the plurality of data scrub operations may be configured to send a data scrub configuration to the plurality of peer storage devices. The data scrub configuration may define a data scrub schedule, a data scrub pattern, the scrubbing peer storage device, and the target peer storage device for each of the plurality of data scrub operations. Means may be provided for recovering at least one failed data unit from the first data segment using recovery data from the plurality of peer storage devices. The means for recovering the at least one failed data unit may be configured to automatically respond to the data scrub operation and transfer the recovery data between the peer storage devices over the peer communication channel.

The various embodiments advantageously apply the teachings of multi-device peer storage systems to improve the functionality of such computer systems. The various embodiments include operations to overcome or at least reduce the issues in the previous storage systems discussed above and, accordingly, are more reliable and scalable than other computer data storage architectures for some applications. That is, the various embodiments disclosed herein include hardware and/or software with functionality to improve the reliability and scalability of peer-to-peer data scrub operations, based on enabling peer-to-peer data scrub with limited involvement of the storage control plane.

Accordingly, the embodiments disclosed herein provide various improvements to storage systems.

It should be understood that language used in the present disclosure has been principally selected for readability and instructional purposes, and not to limit the scope of the subject matter disclosed herein.

DETAILED DESCRIPTION

Figure 1:
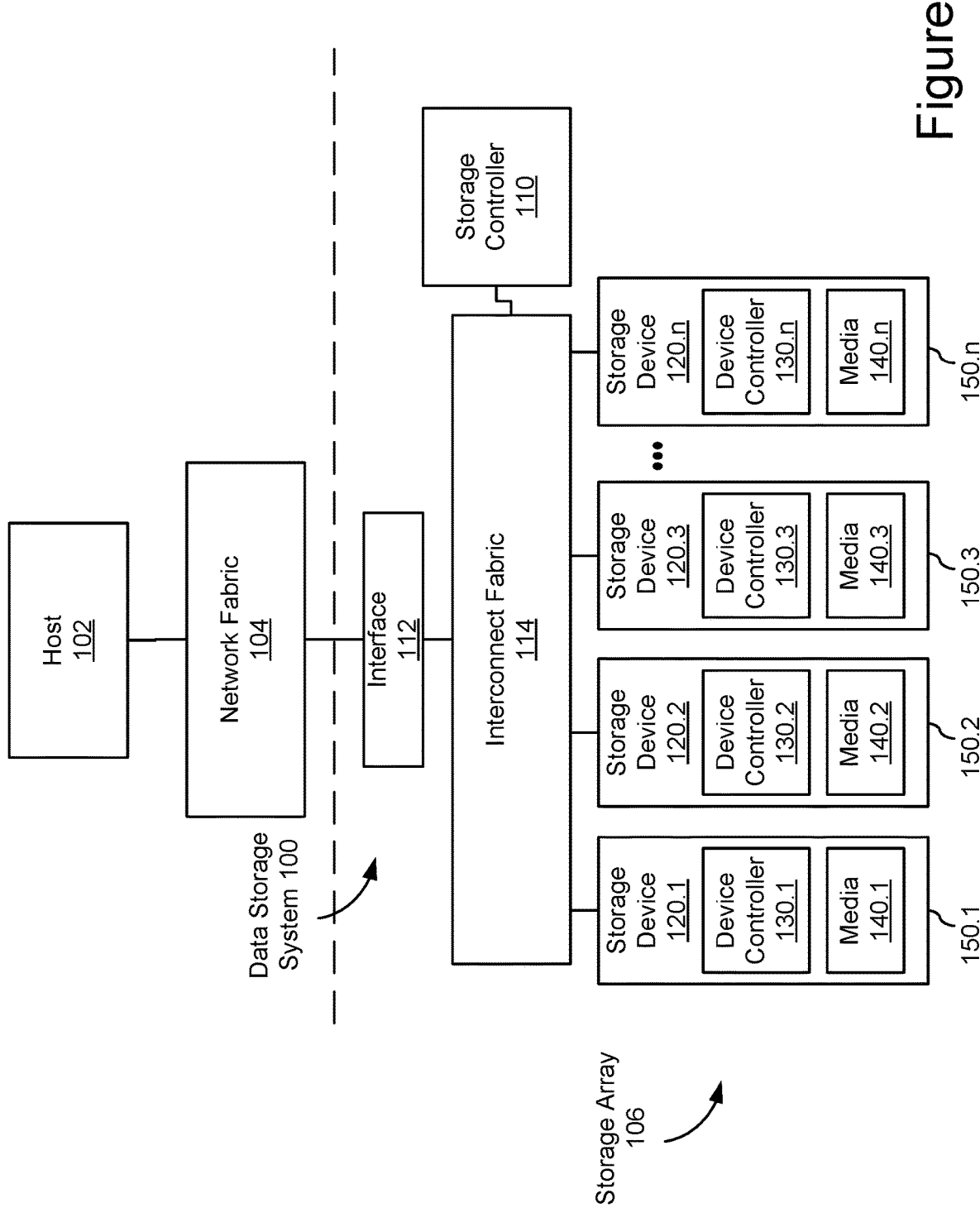
FIG. 1 schematically illustrates an example of a peer storage system.

FIG. 1 shows an embodiment of an example data storage system 100 with peer communicating data storage devices 120. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, storage devices, or disk drives) configured in a peer group 106.

In the embodiment shown, peer group 106 includes a number of storage devices 120 attached to a common interconnect fabric 114. For example, peer group 106 may include a number of disk drives arranged in a storage array, such as storage devices sharing a common rack or unit in a data center. In some embodiments, peer group 106 may share back plane connectivity, network switch(es), and/or other hardware and software components related to interconnect fabric 114. In some embodiments, peer groups may not be collocated in the same unit, rack, data center, or geography. For example, interconnect fabric 114, network interface 112, and network fabric 104 may enable peer-to-peer communication among storage devices over any distance and peer bonds may be established regardless (or even because of) different geographic locations, data centers, administrators, and organizations. In some embodiments, peer group 106 may be defined by peer bonds that enable peer-to-peer communication without the intervention of related storage control planes.

In some embodiments, the data storage devices 120 are, or include, solid-state drives (SSDs). Each data storage device 120.1-120.n may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing 150, such as a multi-part sealed housing with a defined form factor and ports and/or connectors for interconnecting with interconnect fabric 114.

In some embodiments, a respective data storage device 120 may include a single medium device 140 while in other embodiments the respective data storage device 120 includes a plurality of media devices. In some embodiments, media devices include NAND-type flash memory or NOR-type flash memory. In some embodiments, data storage device 120 includes one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

Storage controller 110 is coupled to data storage devices 120.1-120.n through interconnect fabric 114. However, in some embodiments, storage controller 110 may be hosted as a component and/or a subsystem of another component of data storage system 100. For example, in some embodiments, some or all of the functionality of storage controller 110 may be implemented by software executed on one or more compute resources in at least one of data storage devices 120.1-120.n, interconnect fabric 114, or interface 112. Storage controller 110 is sometimes called a controller system, a main controller system, a non-volatile memory express (NVMe) controller, garbage collection (GC) leader, or storage virtualization controller (SVC). In some embodiments, a device controller 130.1 associated with a particular storage device (e.g., 120.1) acts as storage controller 110 for other storage devices (e.g., 120-2, 120-3, and 120.n) in data storage system 100. In some embodiments, storage controller 110 is a component and/or subsystem of host 102 (described below).

In some embodiments, host 102 is coupled to data storage system 100 through network interface 112 over a network fabric 104. In some embodiments, multiple hosts 102 (only one of which is shown in FIG. 1) are coupled to data storage system 100 through network interface 112, which may be a storage network interface or other interface capable of supporting communications with multiple hosts 102. Network fabric 104 may include a wired and/or wireless network (e.g., public and/or private computer networks in any number and/or configuration) which may be coupled in a suitable way for transferring data. For example, network fabric 104 may include any means of a conventional data communication network such as a local area network (LAN), a wide area network (WAN), a telephone network, such as the public switched telephone network (PSTN), an intranet, the internet, or any other suitable communication network or combination of communication networks.

Host 102, or a respective host in a system having multiple hosts, may be any suitable computer device, such as a computer, a laptop computer, a tablet device, a netbook, an internet kiosk, a personal digital assistant, a mobile phone, a smart phone, a gaming device, a computer server, or any other computing device. Host 102 is sometimes called a host system, client, or client system. In some embodiments, host 102 is a server system, such as a server system in a data center. In some embodiments, the one or more hosts 102 are one or more host devices distinct from storage controller 110 and distinct from the plurality of storage devices 120; but in some other embodiments, the one or more hosts 102 include one of the storage devices 120 that has been configured to perform data processing operations and to send data storage commands to access data stored in the one or more storage devices 120. In some other embodiments, the one or more hosts 102 are configured to store and access data in the plurality of storage devices 120.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

The one or more device controllers 130, if included in a respective storage device 120, are coupled with storage controller 110 through interconnect fabric 114. Interconnect fabric 114 is sometimes called a data connection, but typically convey commands in addition to data, and optionally convey metadata, error correction information and/or other information in addition to data values to be stored in media devices 140 and data values read from media devices 140.

In some embodiments, however, storage controller 110, the one or more device controllers 130, and media devices 140 are included in the same device (i.e., an integrated device) as components thereof. Furthermore, in some embodiments, one or more of the storage devices 120 (e.g., including storage controller 110, the one or more device controllers 130, and media devices 140) are embedded in a host device (e.g., host 102), such as a mobile device, tablet, other computer or computer-controlled device, and the methods described herein are performed, at least in part, by the embedded storage controller. In some embodiments, device controllers 130 are configured to both control one or more media devices 140 and provide distributed storage controller functions in conjunction with storage controller 110.

In some embodiments, storage devices 120 include a plurality of media devices 140, such as flash memory devices, and optionally includes fewer device controllers 130. Viewed another way, in some embodiments, a storage device 120 includes multiple memory channels, each of which has a device controller 130 and a set of media devices 140 coupled to the device controller 130. However, in some embodiments, two or more memory channels share a device controller 130. In either example, each memory channel has its own distinct set of media devices 140. In a non-limiting example, the number of memory channels in a typical storage device is 8, 16, or 32. In another non-limiting example, the number of media devices 140 per memory channel is typically 8, 16, 32, or 64. Furthermore, in some embodiments, the number of media devices 140 in one memory channel is different from the number of media devices in another one of the memory channels.

In some embodiments, each device controller of device controllers 130 includes one or more processing units (also sometimes called CPUs or processors or microprocessors or microcontrollers) configured to execute instructions in one or more programs (e.g., in device controllers 130). In some embodiments, the one or more processors are shared by one or more components within, and in some cases, beyond the function of device controllers 130. As noted above, media devices 140 are coupled to device controllers 130 through connections that typically convey commands in addition to data, and optionally convey metadata, error correction information and/or other information in addition to data values to be stored in media devices 140 and data values read from media devices 140. Media devices 140 may include any number (i.e., one or more) of memory devices including, without limitation, non-volatile semiconductor memory devices, such as flash memory device(s).

Flash memory device(s) (e.g., media devices 140) can be configured for enterprise storage suitable for applications such as cloud computing, for database applications, primary and/or secondary storage, or for caching data stored (or to be stored) in secondary storage, such as hard disk drives. Additionally, and/or alternatively, flash memory device(s) (e.g., media devices 140) can also be configured for relatively smaller-scale applications such as personal flash drives or hard-disk replacements for personal, laptop, and tablet computers. Although flash memory devices and flash controllers are used as an example here, in some embodiments storage device(s) 120 include other non-volatile memory device(s) and corresponding non-volatile storage controller(s).

In some embodiments, media devices 140 are divided into a number of addressable and individually selectable blocks, sometimes called erase blocks or programming blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on media devices 140 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts.

Media segments may include physical storage locations on media devices 140, which may also correspond to one or more logical storage locations. In some embodiments, media segments may include a continuous series of physical storage location, such as adjacent data units on a storage medium, and, for flash memory devices, may correspond to one or more media erase or programming blocks. Data segments may include a plurality of data units that may be described by a series of LBAs, such as host LBAs. In some embodiments, a media segment on one storage device may contain one or more data segments and these data segments may include data integrity relationships with corresponding data segments on other storage devices, such as parity data, mirror data, and/or RAID stripes.

Figure 2:
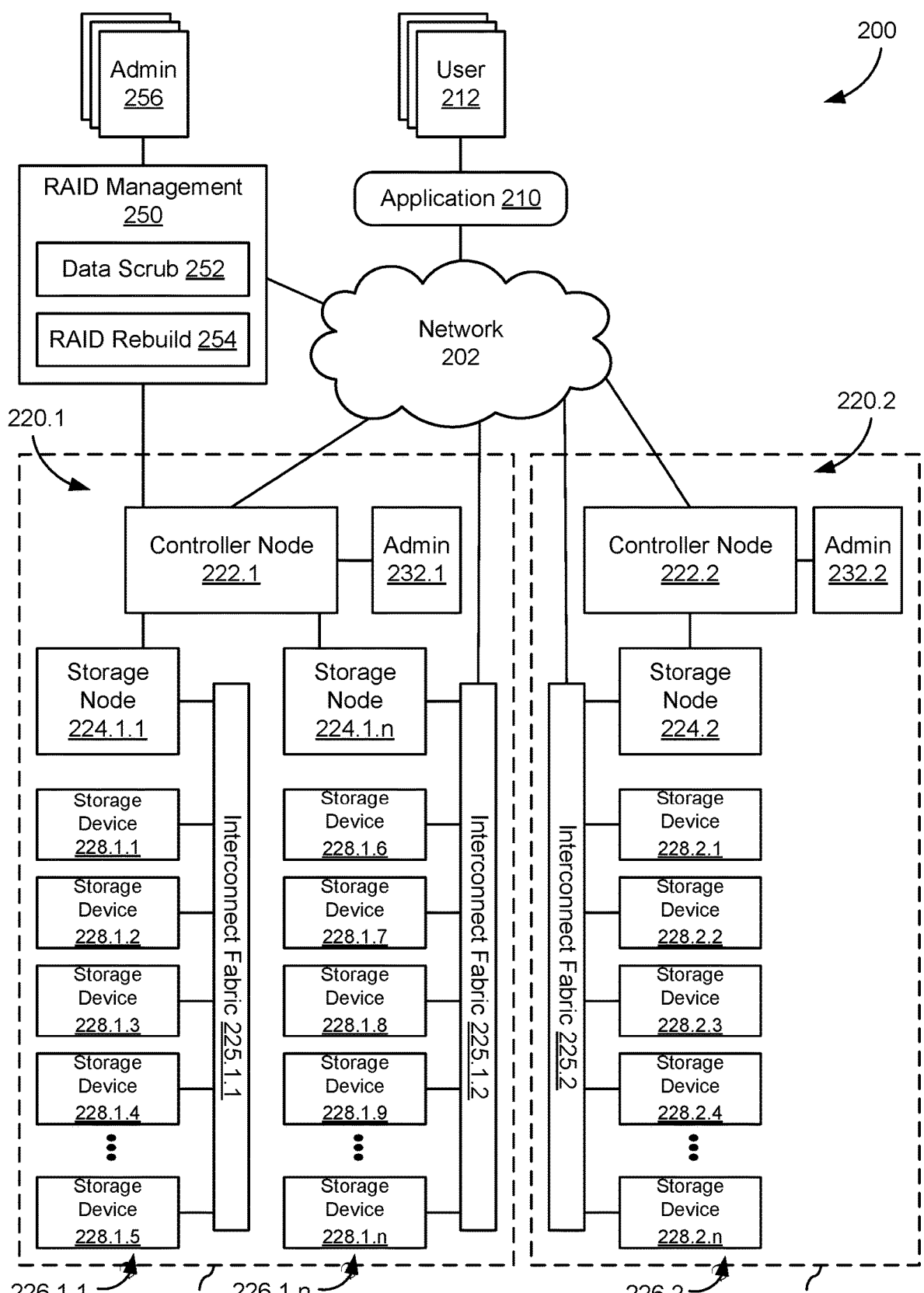
FIG. 2 schematically illustrates an example storage control plane configuration for one or more peer storage systems.

FIG. 2 shows an embodiment of an example storage system 200, such as a global storage system implementing multiple distributed storage systems 230 in different locations 220. Storage system 200 may be implemented as a plurality of distributed storage systems 230 which is coupled to an application 210 for accessing, storing, and using data stored in storage system 200. Storage system 200 may include a plurality of storage devices 228 configured as components of the disaggregated storage systems and some or all of these storage devices 228 may be configured for peer communication and allocated in one or more peer groups. In some embodiments, these peer groups may include storage devices at different physical locations 220 with different administrators 232. Additional remote administrators 256 may have various responsibilities for storage system 200 and use a network-based RAID management system 250 to configure, monitor, and control data recovery across storage system 200.

The connection between storage system 200 and application 210 could, for example, be implemented as a suitable data communication network 202, such as a LAN, WAN, internet, etc. Application 210 could, for example, be a dedicated software application running on a computing device, such as a personal computer, a laptop, a wireless telephone, a personal digital assistant or any other type of communication device that is able to interface with the storage system 200. In some embodiments, application 210 could, for example, comprise a suitable file system which enables a general purpose software application to interface with storage system 200, an application programming interface (API) library for the storage system 200, etc. In some embodiments, application 210 may be a user application, such as business or personal application instantiated in a local, client/server, web, and/or mobile application that enables users 212 to interact with data stored in storage system 200.

As further shown in FIG. 2, storage system 200 comprises two storage locations 220 implementing disaggregated storage architectures. Each storage location 220 may include a controller node 222 and one or more storage nodes 224 which may be coupled in a suitable way for transferring data, for example by means of interconnect fabrics 225. Each of storage nodes 224 may further connect to a plurality of storage devices 228 arranged in storage arrays 226. Controller nodes 222, storage nodes 224, and storage devices 228 may connect to the data communication network 202 and each other by means of suitable wired, wireless, optical, etc. network connections or any suitable combination of such network connections.

Although the example of Figures shows only two controller nodes 222, three storage nodes 224, three storage arrays 226, and fifteen storage devices 228, storage system 200 could comprise any other suitable number of controller nodes 222, storage nodes 224, and storage devices 228 arranged in any number of storage arrays 226. As shown in FIG. 1, each storage array 226 may be configured as a peer group. In some embodiments, peer groups may not include every storage device in a storage array and/or peer groups may include storage devices from different arrays and/or different locations. Any number of storage devices 228 may be configured for one or more peer groups and, in some embodiments, storage devices 228 may participate in multiple peer groups at the same time.

Controller nodes 222 and storage nodes 224 can be built as general-purpose computers, however more frequently they are physically adapted for arrangement in large data centers, where they are arranged in modular racks comprising standard dimensions. Exemplary controller nodes 222 and storage nodes 224 may be dimensioned to take up a single unit of such rack, which is generally referred to as 1U. Such an exemplary storage node 224 may use a low-power processor and may be equipped with ten or twelve high capacity serial advanced technology attachment (SATA) storage devices 228 (even though only five storage devices 228 are shown for each storage node 224) and is connectable to the network over redundant Ethernet network interfaces. In some embodiments, storage nodes 224 may include a compute complex providing storage controller or other storage-related functionality.

An exemplary controller node 222 may comprise high-performance servers and provide network access to applications 210 over multiple high bandwidth Ethernet network interfaces. Data can be transferred between applications 210 and such a controller node 222 by means of a variety of network protocols including hypertext transfer protocol (HTTP)/representational state transfer (REST) object interfaces, language-specific interfaces such as Microsoft .Net, Python or C, etc. Additionally, such controller nodes may comprise additional high bandwidth Ethernet ports to interface with the storage nodes 224. In some embodiments, HTTP/REST protocols complying with S3 may enable data transfer through a REST application protocol interfaces (API). Preferably, such controller nodes 222 operate as a highly available cluster of host nodes, and provide for example shared access to the storage nodes 224, metadata caching, protection of metadata, etc.

Several storage nodes 224 can be grouped together, for example because they are housed in a single rack or a single physical location 220.1. For example, storage nodes 224.1.1 to 224.1.n may be grouped in physical location 220.1 and support host node 202.1, while storage node 224.2 may be located in physical location 220.2 and support host node 202.2. These physical locations 220 are not required to be located at the same geographic location, they are often geographically dispersed across different data centers. For example, physical location 220.1 can be located at a data center in Europe and physical location 220.2 at a data center in China. A peer group may communicate between physical locations 220 and may engage in peer-to-peer data operations, such as data offloading or rebuild from RAID or mirrored data, across physical locations 220 through network 202. In some embodiments, administrator 232.1 in location 220.1 and administrator 232.2 in location 220.2 may not control when peer data operations occur between storage devices 228.

Controller nodes 222, storage nodes 224, and/or host systems for application 210 and/or RAID management system 250, may provide a storage control plane for storage devices 228. In some embodiments, the storage control plane may include any system components that provide host read/write, RAID management, and/or storage array or storage system level data management commands that are not themselves peer storage devices. For example, the storage control plane may include a combination of storage controllers, host controllers, RAID controllers, and similar systems. The storage control plane may be distinguishable (in terms of function) from interconnect and network fabric systems that are responsible for providing physical and data layer communication between system components, which may include addressing and routing of data frames. In some embodiments, the same hardware may participate in the storage control plane and the interconnect and/or network fabric, but the storage control plane functions relate to originating and/or translating media storage related commands (session, presentation, and/or application layer activities) and are distinguishable from networking functions (physical, data link, and network layer activities). In some embodiments, peer storage devices may provide storage control commands to one another, but they are not part of the storage control plane.

In some embodiments, RAID management system 250 may be configured as an application or module in an information technology (IT) management system running on a general-purpose computer, such as such as a personal computer, a laptop, a tablet, a wireless telephone, a personal digital assistant or any other type of communication device that is able to interface with the storage system 200 and/or operational data about storage system 200 over network 202. For example, RAID management system 250 may provide a dashboard for system maps, configuration information, operating data, system/component diagnostics, performance metrics, and/or status information for storage devices 228, storage arrays 226, storage nodes 224, controller nodes 222, etc. In some embodiments, RAID management system 250 may include RAID configurations, rebuild status, backup/archive configurations, storage device endurance and life-cycle management, and/or peer group configurations. RAID management system 250 may support a number of administrators 256 with varying IT management responsibilities, including provisioning, maintenance, data management, equipment management, and related scheduling, costing, and project management.

In some embodiments, RAID management system 250 may include a data scrub module 252 and a RAID rebuild module 254. Data scrub module 252 may include logic and data structures for managing systematic data scrub of storage devices 228 to identify storage locations that have become unreadable, unwritable, and/or error prone. For example, data scrub module 252 may coordinate systematic data reads and writes to pages or sectors in storage devices 228 by issuing individual read/write commands and collecting completion and/or error data and/or initiating a data scrub routine at the storage device on specified storage locations. These systematic reads and writes may enable error correction to correct some number of accumulated errors and/or identify media segments where the error rate exceeds the capability of error correction within a particular storage device. In some embodiments, data collected by data scrub module 252 may be combined with endurance or performance data to proactively manage data risk and end of life of storage devices 228 and/or media devices therein. In some embodiments, data scrub results may also support RAID stripe allocation and/or mirroring decisions by RAID management system 250. If a threshold of failed reads are passed during data scrub, a storage device 228 or a portion thereof may be identified as a failed drive and initiate a complete or partial RAID rebuild to replace the failed storage device.

RAID rebuild module 254 may respond to a failed storage device among storage devices 228, results of data scrub module 252 identifying a failed or failing storage device, endurance or end-of-life modelling that predicts storage device failure, and/or maintenance decisions of administrators 256. In some embodiments, RAID rebuild module 254 may identify a failed storage device to rebuild and a replacement storage device to which the data from the failed storage device is to be rebuilt based on RAID configuration and the available RAID recovery data in storage devices 228. For example, one or more of storage devices 228 may include mirrored data or participate in a RAID stripe for the XORed and/or parity data for recovering the data from the failed storage device. In some embodiments, RAID rebuild module 254 may be configured for partial rebuilds of less than full storage device replacement and/or partial recovery from the failed storage device (rather than relying solely on recovery data).

In some embodiments, some or all functions of RAID management system 250 may be offloaded to or integrated into other components of storage system 200. For example, RAID management 250 may be integrated into controller nodes 222 and/or storage nodes 224. In some embodiments, one or more functions may be wholly or partially offloaded to storage devices 228. For example, storage devices 228 may be configured for self-data scrubbing, with or without coordination by data scrub module 252. In some embodiments, storage devices 228 may be configured for offloaded RAID management, which may include allocation of RAID stripes and/or data mirroring and/or rebuild of failed storage devices, with or without coordination by RAID rebuild module 254. In some embodiments, storage devices 228 may be configured for data recovery based on RAID configuration and/or RAID recovery data from peer storage devices for selective storage location and partial RAID rebuilds. In some embodiments, these offloaded RAID management services from RAID management system 250 may be configured as offloaded services in storage devices 228.

Figure 3:
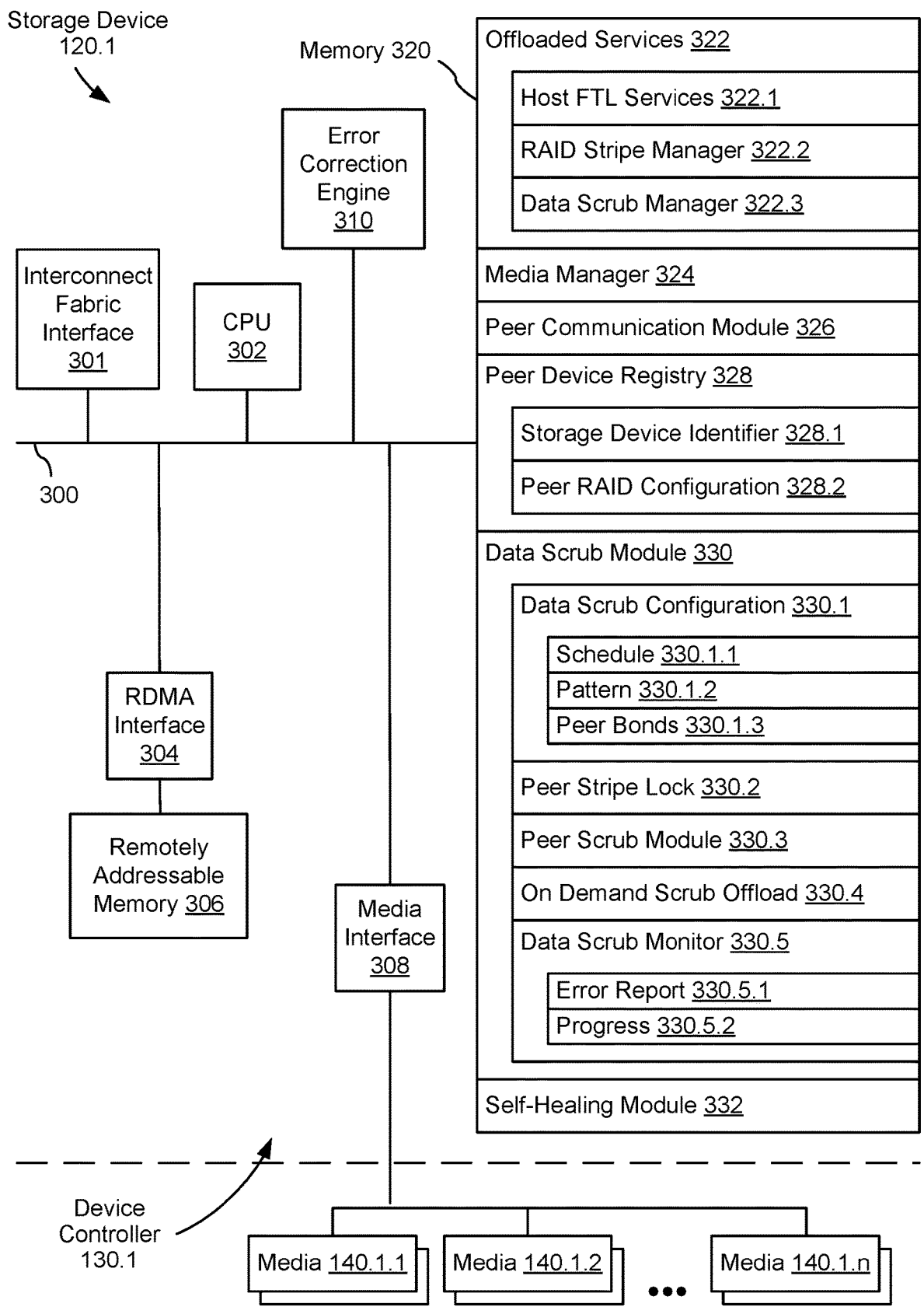
FIG. 3 schematically illustrates an example of a storage device of the peer storage system of FIG. 1.

In some embodiments, as shown in FIG. 3, a storage device 120.1 includes the functions of a device controller 130.1 with peer communication capabilities using compute resources, such as one or more processing units (CPUs 302), sometimes herein called CPU, processors, or hardware processors, and sometimes implemented using microprocessors, microcontrollers, or the like, configured to execute instructions in one or more programs (e.g., the modules in memory 320). In some embodiments, the one or more CPUs 302 are shared by one or more components within, and in some cases, beyond the function of storage device 120. The modules in memory 320 and executed by CPU 302 may be coupled to interconnect fabric interface 301, RDMA interface 304, media interface 308, error correction engine 310, and any number of additional modules, such as erasure coding engines, specialized memory modules, etc., in order to coordinate the operation of these components. In some embodiments, the components of storage device 120.1 may be interconnected by one or more communication buses 300. In some embodiments, CPU 302, memory 320, media interface 308, error correction engine 310, and any number of additional modules may be packaged as a device controller 130.1, such as an NVM controller, implemented in an application-specific integrated circuit (ASIC), system on a chip (SoC), field programmable gate array (FPGA), or similar architecture.

In some embodiments, storage device 120.1 may be packaged in a housing (not shown in FIG. 3, but see housing 150.1 in FIG. 1), such as a sealed, multipart disk drive housing. For example, device controller 130.1 and media devices 140.1 may be enclosed in the housing. In some embodiments, the housing may have an exterior surface surrounding the internal components, with one or more connectors projecting from or interface ports recessed into the exterior surface. For example, these connectors and/or interface ports may provide physical interconnects for power to and communication with storage device 120.1.

Storage device 120.1 may include a variety of local memory resources and local compute resources. In some embodiments, local resources may include components that are integrated into storage device 120.1 and may scale with the number of storage devices. Example local memory resources may include memory 320 (e.g. the operating memory of media controller 130.1), remotely addressable memory 306 (e.g. remotely addressable memory available through a remotely addressable interface), and other specialized memory (not shown). In some embodiments, storage media, such as media devices 140, may provide local memory resources for data management functions, but these may be distinct from storage locations for host data. Example local compute resources may include CPU 302 (e.g. the operating processor of device controller 130.1), erasure coding engines, error correction engines, and any other specialized processing systems. In some embodiments, one or more interfaces, such as interconnect fabric interface 301 or RDMA interface 304, may also include or utilize memory and/or compute resources and may be part of the available local resources of storage device 120.1.

In some embodiments, RDMA interface 304 may be a hardware, software, or combined hardware/software engine for providing remote data management access to remotely addressable memory 306. This may include local direct memory access (DMA) to remotely addressable memory 306 for CPU 302 or other components of device controller 130.1. The RDMA engines of RDMA interface 304 may allow storage device 120.1 to push or pull data from/to remotely addressable memory 306 and to/from memory locations in other storage devices, storage controllers (e.g. storage controller 110), or servers (e.g. host 102).

In some embodiments, error correction engine 310 may be a hardware, software, or combined hardware/software engine for calculating error correction codes (ECC) or implementing another data error correction operation. Error correction engine 310 may support multiple functions stored in memory 320 and/or support error correction processing of data being transferred to or from remotely addressable memory 306, with or without RDMA interface 304. In some embodiments, error correction engine 310 may be used to process media segments during data scrub processes, such as performing error correction on read data units to determine whether the data unit is recoverable using ECC or the data unit is a failed or corrupted data unit.

Additional modules (not shown) supporting one or more functions of storage device 120 may be connected to CPU 302, RDMA interface 304, media interface 308, error correction engine 310, and memory 320. In some embodiments, additional module(s) are executed in software by the CPU 302; in other embodiments, additional module(s) are implemented in whole or in part using special purpose circuitry (e.g., to perform encoding and decoding functions).

In some embodiments, during a write operation initiated by a host 102, storage controller 110 receives a host write command (e.g., in a set of one or more host write commands) via interface 112 (FIG. 1), translates that host write command into a write command, sometimes called a translated command or translated write command, suitable for execution by a data storage device 120, and sends the translated host data command to one or more data storage devices corresponding to one more addresses specified by the host write command, a destination storage device.

In some storage systems, a storage controller also receives, via interface 112, data to be stored in the one or more data storage devices corresponding to the one more addresses specified by the host write command. A respective data storage device receives the data to be stored in its media devices 140.1.1-140.1.n, or a portion of the data to be stored, from the storage controller via the interconnect fabric 114. The data received by the storage device may be encoded or otherwise processed and made available to storage media interface 308, which transfers the data to media devices 140.1 in a manner dependent on the type of storage medium being utilized. In storage device 120, RDMA interface 304 and remotely addressable memory 306, sometimes in conjunction with coordination from storage controller 110, may allow host 102 to send the data to be stored in the host write command to remotely addressable memory 306 in storage device 120 without them passing through storage controller 110 or another storage controller.

In some embodiments, a storage media (e.g., media devices 140.1) is divided into a number of addressable and individually selectable blocks and each block is optionally (but typically) further divided into a plurality of pages and/or word lines and/or sectors, storage locations of defined storage unit sizes. While erasure of data from a storage medium is performed on a block basis, in many embodiments, reading and programming of the storage medium is performed on a smaller subunit of a block (e.g., on a page basis, word line basis, or sector basis).

In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called the fast page), and (2) an upper page (sometimes called the slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism or ECC code) is a choice made when data is actually written to the storage media.

In addition, these various memory cell configurations and encoding formats may impact the lifetime performance of storage device 120.1. Flash memory may have defined I/O performance, endurance, write voltage thresholds, error rates, cell/device failures, and other parameters that may be tracked for specific performance values and/or contributions to storage capacity, performance class, endurance, and/or overall health. Similarly, cell usage, read and write load balancing, garbage collection, and other operations may be tracked for endurance, reliability, and failure prediction for media devices 140.

FIG. 3 is a block diagram illustrating example offloaded services, peer communications, and data scrub and recovery handled by storage device 120.1 and its peer storage devices 120, in accordance with some embodiments. Storage device 120.1 includes CPU 302 for executing modules, programs, and/or instructions stored in memory 320 and thereby performing processing operations, memory 320 (sometimes called NVM controller memory, device controller memory, or operating memory), and one or more communication buses 300 for interconnecting these components.

The one or more communication buses 300 optionally include circuitry (sometimes called a chipset) that interconnects and controls communications between system components. CPU 302 and memory 320 may be coupled to interconnect fabric interface 301, RDMA interface 304, remotely addressable memory 306, media interface 308, error correction engine 310, media devices 140.1, and any additional module(s) by the one or more communication buses 300. In some embodiments, interface hardware and/or protocols for providing communication through communication buses 300 may also be present for communication with any given component.

Memory 320 may include high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 320 may optionally include one or more storage devices remotely located from CPU 302. In some embodiments, one or more additional memories may be provided for specific functions, such as an FTL memory for flash translation layer (FTL) data, and/or remotely addressable memory 306. These functional memories may include specialized processing, hardware acceleration, and/or other resources related to their function. In some embodiments, remotely addressable memory 306 may be part of memory 320.

Memory 320, or alternatively the non-volatile memory device(s) within memory 320, comprises a non-transitory computer readable storage medium. In some embodiments, memory 320, or the non-transitory computer readable storage medium of memory 320 stores the following programs, modules, and data structures, or a subset or superset thereof:

- offloaded services 322 for providing distributed storage management across peer storage devices, including storage device 120.1;
- media manager 324 for managing storage device FTL data (including logical address mapping) and related processes and requests, such as media read and write operations through media interface 308 to media devices 140.1.1-140.1.n;
- peer communication module 326 for communicating command messages and data transfers between storage devices 120 through interconnect fabric interface 301, sometimes using access to remotely addressable memory 306, without the intervention of host 102, storage controller 110, or similarly distinct storage control plane systems;
- peer device registry 328 for identifying the peer storage device identifiers of peer storage devices and/or storing other data management and/or peer services information related to each other storage device;
- data scrub module 330 for performing a data scrub process on media devices 140.1.1-140.1.n and/or peer storage devices while coordinating with peer storage devices to protect data integrity; and
- self-healing module 332 for recovering failed data units from peer recovery data and storing them to media devices 140.1.1-140.1.n and/or offloading them to a peer storage device.

Each of the above identified elements may be stored in one or more of the previously mentioned memory devices that together form memory 320 and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 320 may store a subset of the modules and data structures identified above. Furthermore, memory 320 may store additional modules and data structures not described above. In some embodiments, the programs, modules, and data structures stored in memory 320, or the non-transitory computer readable storage medium of memory 320, provide instructions for implementing respective operations of the methods described below. In some embodiments, some or all of these modules may be implemented with specialized hardware circuits that subsume part or all of the module functionality.

In some embodiments, offloaded services 322 may provide message handling, processing logic, and/or data structures for one or more data management services that may have otherwise been managed by a host controller, storage controller, RAID controller, or other storage control plane system. In some embodiments, a storage control plane device may still have a role in configuring and/or initiating offloaded services 322. For example, a RAID controller may be used for an initial configuration of RAID parameters and provide a common data structure of those parameters for use by storage device 120.1 and its peer storage devices, but the actual allocation and maintenance of RAID stripes for incoming host writes may be managed by offloaded services 322 and related peer communication. Some example offloaded services 322 may include host FTL management 322.1, RAID stripe management 322.2, and data scrub management 322.3.

In some embodiments, host FTL management 322.1 may provide distributed management of host FTL mapping information. For example, a global host FTL data structure may be segmented and divided among peer storage devices to enable the table size to scale with the number of storage devices. Host FTL service commands may be issued by storage devices and/or storage control plane systems and received by host FTL management 322.1 of the storage device that contains the relevant segment of the host FTL data structure. In some embodiments, host FTL management 322.1 may include commands and related services for allocating, querying, and updating the local host FTL data structure.

In some embodiments, RAID stripe management 322.2 may provide distributed management of the configuration, allocation, and updating of RAID stripe information for one or more RAID groups supported by the peer group. For example, a RAID stripe configuration (stripe depth, RAID group, storage location selection logic, etc.) and RAID stripe mapping information (to locate specific strips and data recovery dependencies) may be distributed across a peer group. RAID stripe commands may be issued by storage devices and/or storage control plane systems and received by RAID stripe management 322.2 to configure and access RAID stripe information. In some embodiments, RAID stripe management 322.2 may calculate the distribution of host data writes and parity calculation and storage for each RAID stripe it is configured to manage and respond to queries when striped host data needs to be modified or recovered. In some embodiments, RAID stripe management 322.2 may include commands and related services for receiving and updating RAID configurations and supporting logic and data structures, as well as responding to queries related to allocating and/or locating RAID strips and data recovery dependencies.

In some embodiments, data scrub management 322.3 may provide distributed management of the configuration, allocation, and data collection from media data scrubs. For example, data scrub management 322.3 may include logic for systematically assigning and prioritizing data scrub tasks among peer storage devices, as well as tracking when media locations have last been scrubbed. Data scrub commands may be issued by storage devices and/or storage control plane systems and received by data scrub management 322.3 to configure data scrub targets, schedules, and patterns and to receive and respond to data scrub commands. For example, data scrub management 322.3 may identify when a particular media segment is due for scrubbing, issue related data scrub commands, and track completion and any reported errors. In some embodiments, data scrub management 322.3 may include commands and related services for receiving and updating data scrub configurations and supporting logic and data structures, as well as sending and receiving commands for initiating data scrubs, tracking data scrub progress, and reporting results.

In some embodiments, media manager 324 manages access to and maintenance of media devices 140.1. For example, media manager 324 may include base FTL services for storage device 120 and manages the storage device FTL map, as well as read, write, and data management access to media devices 140. Host commands involving host data reads, writes, erases, etc. may be directed by media manager 324 through media interface 308 for accessing media devices 140.1. In some embodiments, host data commands may be pre-processed by other modules, such as offloaded services 322, and related internal data access commands may be received by media manager 324. In some embodiments, storage device FTL provides a base level of FTL mapping for storage device 120. Storage device FTL may include allocation of storage locations with a defined size based on compatibility of with storage units in media devices 140.1, such as page size. For example, storage locations may be allocated as 4 KB or 8 KB pages. In some embodiments, allocation sizes for storage locations may correspond to larger multiplane NVM page sizes, such as 96 KB.

Media manager 324 may be responsible for bad block management, bad block spare overprovisioning, and allocation of gap free logical space throughout the life of the media devices 140.1. In some embodiments, media manager 324 may also include error correction (e.g., low-density parity-check (LDPC) or Bose-Chaudhuri-Hocquenghem (BCH) codes) supported by error correction engine 310 and tuning of NVM access parameter (e.g., read levels, programming thresholds, etc.). Media manager 324 may enable reads from logical block address (LBA) storage locations in media devices 140 to write in remotely addressable memory 306 and reads from remotely addressable memory 306 to writes in LBA storage locations in media devices 140.1. In some embodiments, media manager 324 may manage data reads and writes to/from media devices 140.1 to support offloaded services 322, data scrub module 330, and/or self-healing module 332.

In some embodiments, peer communication module 326 may provide communication among storage devices 120 using interconnect fabric 114 without being routed through storage controller 110 or another host, controller, or storage control plane component. For example, peer communication module 326 may enable drive-to-drive messaging addressed by storage device identifiers, peer-drive broadcasts that provide the same message to all peer storage devices, and/or access to shared memory locations, such as remotely addressable memory 306 for direct data transfer and/or access of host and parity data, data management logs, etc. In some embodiments, packetized messages may be routed among storage devices 120.1 using one or more network communication protocols compatible with interconnect fabric 114 and/or network fabric 104.

In some embodiments, peer communication module 326 operates in conjunction with RDMA interface 304 to manage local and remote use of remotely addressable memory 306. For example, local operations by media manager 324 may include writes and reads to remotely addressable memory 306, read/write operations may include coordinated use of space in remotely addressable memory 306 for both local and remote access, and other distributed operations may use space in remotely addressable memory 306 as requested by storage controller 110 or other storage devices.

In some embodiments, peer device registry 328 may be a data structure for maintaining information regarding each other peer storage device in a peer group, such as storage devices 120 in peer group 106. For example, peer device registry 328 may be a table, list, array, database, or similar data structure for storing storage device identifiers 328.1, other addressing information, peer RAID configuration 328.2, and/or additional information on peer storage devices, such as specifications and/or parameters of the storage devices. In some embodiments, storage device identifier 328.1 may include or translate into a network compatible device address for routing data frames from storage device 120.1 to a selected peer storage device.

In some embodiments, peer device registry 328 may include storage device identifiers 328.1 for each storage device corresponding to a peer group shared with storage device 120.1. For example, storage device 120.1 may belong to a peer group A and each other storage device 120 in peer group A may have an entry in peer device registry 328 with a storage device identifier 328.1 for addressing peer communications. For example, each storage device may have an entry (e.g. a row in a table) with a key (e.g. storage device identifier) and a field (e.g. column in a table) for one or more peer group identifiers.

In some embodiments, peer device registry 328 may identify peer storage devices that include parity bonds and/or mirror bonds to support data redundancy and recovery. For example, one or more devices in peer group 106 may participate in a RAID group and contain RAID stripe data (parity data and/or corresponding paired host data) and peer RAID configuration 328.2 may identify which peer storage devices are in the RAID group. One or more devices in peer group 106 may be mirroring some or all host data stored in storage device 120.1 and peer RAID configuration 328.2 may identify which storage devices are mirroring host data for storage device 120.1.

In some embodiments, peer RAID configuration 328.2 may indicate the parity bond and/or mirror bond relationship and may use a peer command and offloaded service, such as RAID stripe management 322.2 and/or data scrub management 322.2 on the bonded peer storage device or another peer storage device, to query for the location of specific parity data or host data. For example, when a data unit has failed or been identified for a data scrub operation, the host LBA(s) of the failed units may be included in a peer query command to one or more of the corresponding peer storage devices identified in peer RAID configuration 328.2 and each storage device queried may return a response acknowledging whether it has the relevant data and the storage location for retrieving it and/or locking it.

In some embodiments, peer RAID configuration 328.2 may include or reference a local data structure and/or provide logic for specifically mapping a failed host data unit to its corresponding data on one or more peer storage devices. For example, when a data unit has failed or been identified for a data scrub operation, the host LBA(s) of the failed units may be used to index peer RAID configuration 328.2 and identify the specific device and/or storage location of the desired corresponding data for data recovery or data lock.

In some embodiments, storage device 120.1 may include a data scrub module 330 for executing a data scrub process on storage media 140.1 and/or the storage media of peer storage devices. For example, data scrub module 330 may be configured to execute self-data scrub operations independently and/or in response to peer or host offloading commands. In some embodiments, data scrub module 330 may also execute data scrubs on the storage media of peer storage devices.

In some embodiments, data scrub module 330 may include a data scrub configuration 330.1 describing one or more data scrub profiles for a data scrub process. For example, data scrub configuration 330.1 may include a default self-scrub configuration for conducting periodic self-data scrub and/or one or more configurations for peer storage devices. In some embodiments, storage device 120.1 may be configured to receive and store parameters for a data scrub configuration from a data scrub manager, such as an offloaded peer data scrub manager 322.3 or a storage control plane data scrub manager (e.g. data scrub module 252 in FIG. 2). Example parameters for a data scrub profile may include a schedule 330.1.1, pattern 330.1.2, and relevant peer bonds 330.1.3.

A data scrub schedule 330.1.1 may include criteria for initiating a data scrub process. For example, a data scrub schedule may be periodic based on calendar/clock information, periodic based on a number of reads/writes since the media segment was last scrubbed, and/or event-based, such as a read/write error threshold, availability of compute resources in storage device 120.1, and/or receipt of a host command (such as on demand scrub offload 330.4). In some embodiments, data scrub schedule 330.1.1 may be built into the logic of data scrub module 330 for selecting when a data scrub may be initiated.

A data scrub pattern 330.1.2 may include criteria for selecting and queuing media segments for a data scrub process. For example, once a data scrub process has been selected for initiation, one or more media segments may be selected for the process based on the host LBAs relevant to a triggering schedule (calendar schedule, time/writes since last scrub of those media segments, error event, command, etc.). In some embodiments, data scrub pattern 330.1.2 may define a round-robin pattern for scanning all media in a storage device and may track the end point of a prior data scrub process to use as a starting position.

Peer bonds 330.1.3 may include storage device identifier for peer bonds relevant to corresponding data on peer storage devices. For example, peer bonds 330.1.3 may identify one or more peer storage devices containing corresponding data that should be locked during a data scrub process to prevent loss of data consistency across mirrored or RAID striped data. In some embodiments, peer bonds 330.1.3 may be dynamically generated at the time of a data scrub process by querying peer device registry 328 and/or using storage device identifiers 328.1 and peer communication module 326 to query relevant peer storage devices to identify corresponding data that should be locked. In some embodiments, peer bonds 330.1.3 may be received as a parameter of a peer or host command initiating the data scrub process.

In some embodiments, a peer stripe lock commands 330.2 may be issued through peer communication module 326 to one or more peer storage devices including corresponding data for the data segments in the media segments being scrubbed. For example, when a data scrub process is initiated peer stripe lock commands 330.2 may be sent to each peer storage device with corresponding data specifying what corresponding data (by host LBAs) should be locked to prevent writes to those LBAs during the scrub process. Peer stripe lock commands 330.2 may also include lock release commands that are sent to release the lock after the data scrub process on those data segments has been completed. The scope and frequency of lock commands and release commands may be configured based on data unit size, communication lag, and/or other factors. In some embodiments, when peer stripe lock commands 330.2 are received, a peer storage device may be configured through its own data scrub module, media manager 324, or another module to temporarily disable write and/or read operations the identified corresponding data segment during the lock period (such as from receipt of a lock command to the receipt of a release command).

In some embodiments, data scrub module 330 may include a peer scrub module 330.3 for initiating data scrub processes on peer storage devices. For example, storage device 120.1 may act as a data scrub manager though an offloaded service, such as data scrub manager 322.3 and/or may initiate or respond to a peer data scrub process for a peer storage device to provide management and/or processing. In some embodiments, peer scrub module 330.3 may be initiated by a peer data scrub command received from a peer storage device (for direct scrub support) and/or a peer storage device or storage control plane system acting as data scrub manager. For example, peer scrub 330.3 module may receive a command with parameters for a data scrub configuration, plus a target peer storage device that contains the storage media to be scrubbed. In some embodiments, peer scrub module 330.3 may be initiated by a data scrub configuration for one or more peer data scrubs that are configured within data scrub module 330 and identify target storage media on peer storage devices.

In some embodiments, peer scrub module 330.3 may issue data scrub commands similar to those issued by a data scrub manager that request specific read/write commands for a data segment and collect any error data. For example, peer scrub module 330.3 may include a peer scrub configuration with pattern 330.1.2 including data segments on a peer storage device and may issue a series of read/write commands to that peer storage device for data units corresponding to those data segments in a queue defined by pattern 330.1.2. In some embodiments, data scrub configuration 330.1 may include schedules and patterns that span media segments on a plurality of storage devices, such as every peer storage device in a RAID group, and proceed through patterns in a combination of self-data scrub and peer data scrub operations.

In some embodiments, peer scrub module 330.3 may use peer data transfers to assist in data scrub operations and enable data scrub operations that move data segments from one storage device to another storage device. For example, the read operation for a data scrub may read the data segment to remotely addressable memory 306 (with ECC correction on read) and the write may include a remote read from and write to another peer storage device. Peer scrub module 330.3 may also be configured to address the host FTL changes by such a transfer, such as through host FTL services 322.1.

On some embodiments, data scrub module 330 may include on demand scrub offload 330.4 for selectively implementing self-scrub, peer data scrub, and/or data scrub management in response to an event and/or compute resource constraint in a peer storage device or storage control plane system. For example, if a storage control plane system with a data scrub module is managing data scrub allocation, monitoring, and data collection across peer group 106 and becomes resource constrained due to other processing tasks (such as a RAID rebuild or high host read/write demand), it may issue a data scrub management command to allocate a data scrub configuration 330.1 to storage device 120.1 for execution while the storage control plane system is otherwise engaged. In some embodiments, a similar situation may occur with a peer storage device, such as a peer storage device that may have otherwise executed a self-data scrub process. For example, the peer storage device's compute resources may be otherwise engaged in offloaded services or other operations.

In some embodiments, data scrub module 330 may include a data scrub monitor 330.5 to monitor one or more data scrub processes. For example, once a data scrub process is initiated on one or more data segments in storage media 140.1 and/or the storage media of peer storage devices, data scrub monitor 330.5 may monitor for data units containing errors and progress of the process through the target data segments. In some embodiments, an error report 330.5.1 may be generated by data scrub monitor 330.5 to identify data segments scanned and errors occurring within those data segments. For example, error report 330.5.1 may be generated concurrent with the scan or upon completion of the scan and may log errors corrected through ECC and/or data units where the error rate exceeds the effectiveness threshold of the ECC.

In some embodiments, data scrub monitor 330.5 may include a progress monitor 330.5.2 that identifies the queue of data segments in a data scrub process and progress through scrubbing those data segments. For example, when a data scrub process is initiated, the data segments in the pattern may be identified and, as each data segment is completed, it is logged by progress monitor 330.5.2. In some embodiments, this progress may be expressed as a percentage of completion and/or a list of complete and incomplete data segments (or related data units or media segments). In some embodiments, data scrub monitor 330.5 may include a progress monitor 330.5.2 for a pattern of data segments from multiple storage devices. For example, a data scrub process may include a cyclical pattern to scrub data on all peer storage devices in a peer group and/or RAID group.

In some embodiments, data scrub monitor 330.5 may immediately raise an alert or similar event identifying a failed or failing data unit to a system for responding to such alerts, such as self-healing module 332.

In some embodiments, storage device 120.1 may include a self-healing module 332 for recovering and relocating failed data units from a failed or failing storage location to another storage location. For example, self-healing module 332 may identify a failed data unit based on data scrub module 330, identify recovery data needed from a peer storage device based in peer device registry 328, request the recovery data from the peer storage device, and receive and write the recovery data and/or recoverable data from the failed data unit to a new storage location in media devices 140.1. Self-healing module 332 may operate in conjunction with media manager 324 to read any data that can be recovered from the failed storage location, transfer recovery data received from peer storage devices, and write the recovered data unit (which may include both locally recovered data and transferred recovery data) to the new storage location in media devices 140.1. In some embodiments, media manager 324 may select the new storage location and update related mapping information as part of device FTL management.

In some embodiments, a failed data unit may correspond to a RAID stripe or other storage configuration that includes parity-based data recovery (or another erasure encoding method). Self-healing module 332 may include parity rebuild for requesting recovery data based on parity reconstruction of some or all of the failed data unit. For example, parity rebuild may use peer RAID configuration 328.2 to identify the peer storage devices that include corresponding parity data and/or the second set of host data used to erasure encode the failed data unit. In some embodiments, the parity rebuild may request the rebuilt host data from a peer storage device that stores at least one of the parity data or second set of host data and the peer storage device executes the erasure coding operation (XOR) to rebuild the missing data. In some embodiments, the parity rebuild may request the parity data and the second set of host data as recovery data and execute the rebuild of the host data locally. In some embodiments, a failed data unit may correspond to a mirrored data configuration where one or more redundant copies of the host data are maintained on other storage devices such that parity rebuild may not be used.

In some embodiments, self-healing module 332 may recover the failed data unit to a peer storage device instead of storage media 140.1. For example, self-healing module 332 in operation with media manager 324 may identify that no suitable storage locations remain in media devices 140.1 and the recovered host data should be offloaded to another storage device. Self-healing module 332 may include data offload for communicating with one or more peer storage devices to identify a new storage location for the recovered data. In some embodiments, a peer data transfer may be used to offload the recovered data to a new storage location and update host FTL information.

Figure 4:
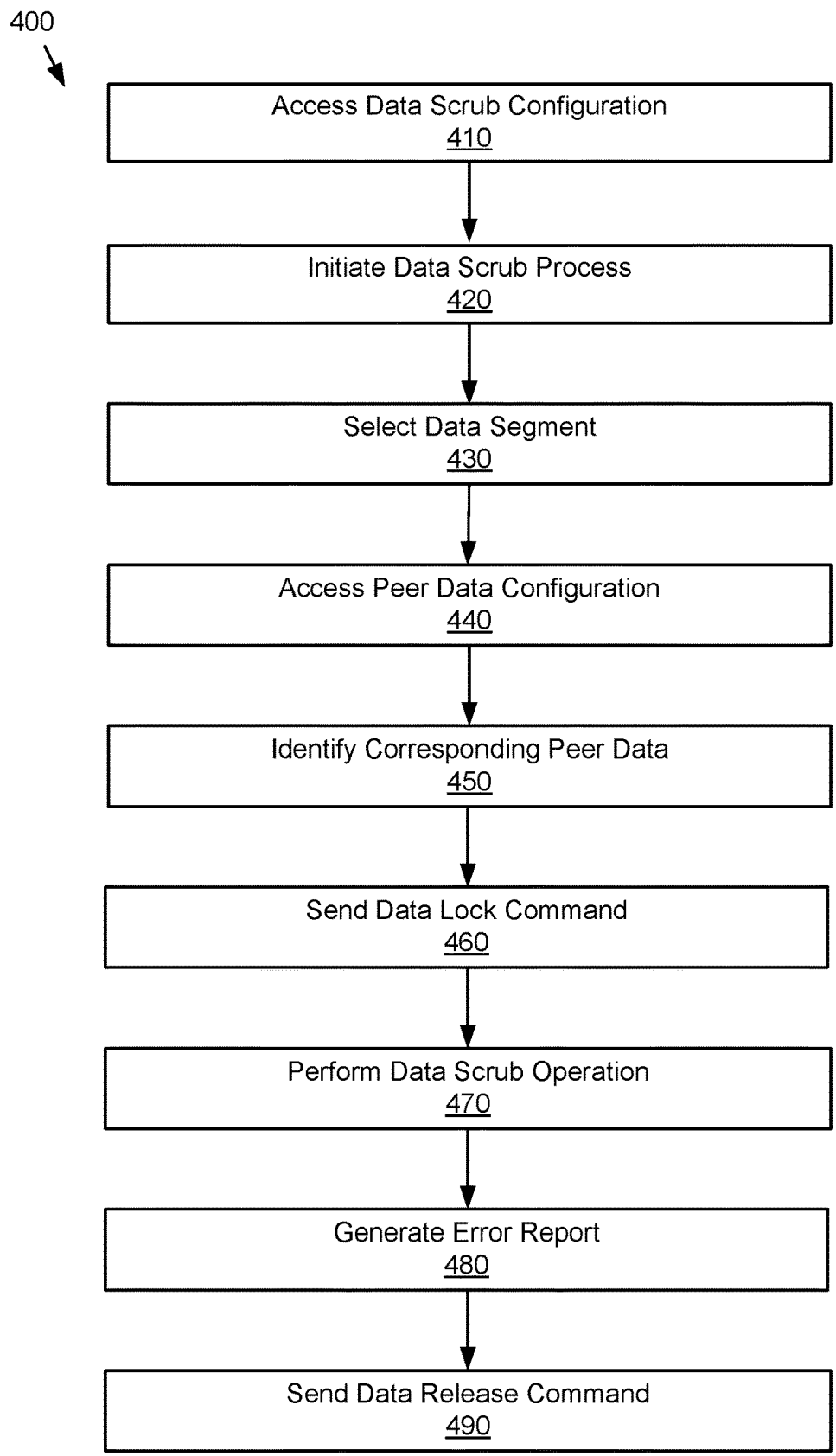
FIG. 4 illustrates an example of a method for performing a data scrub on a storage device with peer-to-peer communication.

As shown in FIG. 4, storage device 120.1 operating within data storage system 100 may be operated among peer data storage devices 120 to perform a data scrub on a data segment. For example, storage device 120.1 may initiate data scrub operations with one or more peer storage devices (e.g. storage devices 120) according to the method 400 illustrated by blocks 410-490 of FIG. 4.

At block 410, a storage device accesses a data scrub configuration for a data scrub process. For example, a peer storage device may include or receive a data scrub configuration include a schedule and pattern of data segments for the data scrub. In some embodiments, the data scrub configuration and/or parameters related thereto may be received in a command from another peer storage device and/or a storage control plane system. For example, a peer storage device may be instantiating a data scrub manager or a storage controller may be instantiating a data scrub manager.

At block 420, a data scrub process is initiated. For example, the data scrub configuration may include a schedule, event trigger, and/or be initiated upon receipt by the storage device.

At block 430, a data segment is selected for the data scrub. For example, the pattern in the data scrub configuration may identify a series of data segments for the data scrub and the series of data segments may be arranged in a queue for processing. The next data segment in the queue may be selected for processing in response to the pattern in the data scrub configuration.

At block 440, a peer data configuration is accessed. For example, the storage device may include a peer device registry that identifies one or more peer storage devices that may contain data units with a data integrity relationship with the data segment selected for the data scrub. In some embodiments, the peer data configuration with storage device identifiers and corresponding peer data unit locations may be stored in the storage device. In some embodiments, the storage device may query one or more peer storage devices though peer communication channels to locate corresponding peer data units.

At block 450, peer data units with a data integrity relationship with the data segment are identified as corresponding data units. For example, the data segment may include a local portion or strip from a RAID stripe and corresponding data units may be additional portions or other strips in the RAID stripe or the data segment may include data units being mirrored to peer storage devices and corresponding data units may be the mirrored copies on the peer storage devices.

At block 460, a corresponding data lock command is sent to the peer storage device or devices that include corresponding data units identified at block 450. For example, two other storage devices with strips corresponding to the data stripe may be identified and the storage device may send a data lock command to those storage devices identifying the date units in the strips to be locked. In some embodiments, the data lock command may identify the host LBAs of the data units to be locked against read and/or write operations to prevent compromising redundant data integrity during the data scrub.

At block 470, the data scrub operation is executed on the data segment. For example, a read operation with ECC correction followed by a write operation back to the storage media may be completed for one or more data units in the data segment. In some embodiments, the number of error corrections made and/or a failed read (based on errors exceeding the error correction capability of the ECC) may be recorded for each data unit read (or attempted). In some embodiments, a data scrub process may include a series of data scrub operations for different sets of data segments where a first portion of the data scrub process is on one set of data segments and another portion is on another set of data segments for as many different data segments as the data scrub process includes.

At block 480, an error report is generated based on the error corrections and/or errors detected in the data scrub operation at block 470. For example, an error report may be generated as each operation is completed and errors may be reported for the data unit scrubbed and/or a summary error report may be generated with the data segment and/or entire data scrub process is completed. In some embodiments, the error report may be sent to a module or system that responds to errors, such as a self-healing module to attempt data recovery.

At block 490, a data release command may be sent to the peer storage devices that received the data lock commands. For example, upon data scrub completion of all data units or data segments related to a corresponding data unit that is locked, a data release command may be sent.

Figure 5:
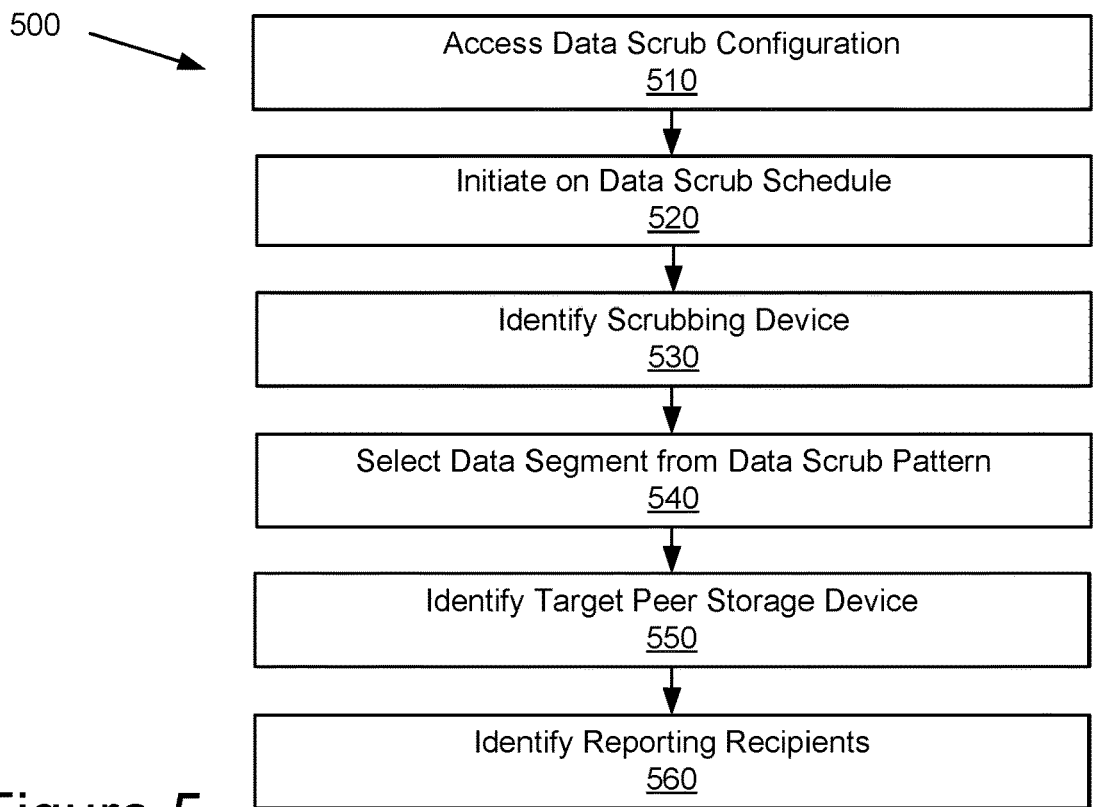
FIG. 5 illustrates an example of a method for managing a peer data scrub using a storage device.

As shown in FIG. 5, storage device 120.1 operating within data storage system 100 may be operated according to a data scrub process in a peer storage device configuration to parse a data scrub configuration. For example, storage device 120.1 may parse a data scrub configuration according to the method 500 illustrated by blocks 510-560 of FIG. 5.

At block 510, a data scrub configuration is accessed. For example, one or more data scrub configurations may be stored in a storage device and/or received in a data scrub command from a peer storage device and/or a storage control plane system.

At block 520, a data scrub process may be initiated based on a data scrub schedule. For example, the data scrub configuration may include a schedule for initiating the data scrub process upon receipt or based on other scheduling criteria.

At block 530, a scrubbing peer storage device may be identified to perform the data scrub process. For example, the receiving data storage device for a data scrub command may be identified as the scrubbing storage device. In some embodiments, a storage device acting as a data scrub manager may include or receive a configuration that identifies peer storage devices as the scrubbing storage device and may issues data scrub commands to those storage devices as part of the data scrub process.

At block 540, a data segment from a data scrub pattern may be selected for one or more data scrub operations. For example, a data segment may be identified based on the data scrub pattern in the data scrub configuration and a queue of data segments representing progress through the data scrub process.

At block 550, a target peer storage device may be identified that includes the data segment selected at block 540. For example, the target peer storage device may include media devices on the storage device executing the data scrub process or may include media devices on peer storage devices. The target peer storage device may be directly identified in the data scrub configuration or may be retrieved from a data structure or query that identifies the location of the data segment by host LBA or another addressing scheme.

At block 560, one or more recipients for receiving error reports related to the data scrub may be identified. For example, a storage control plane system and/or peer storage device initiating the data scrub process or acting as data scrub manager my receive the error reports, as may the scrubbing device and the target device. In some embodiments, error reports may be broadcast to a peer group, RAID group, or other systems relevant to managing data integrity related to the peer storage system.

Figure 6:
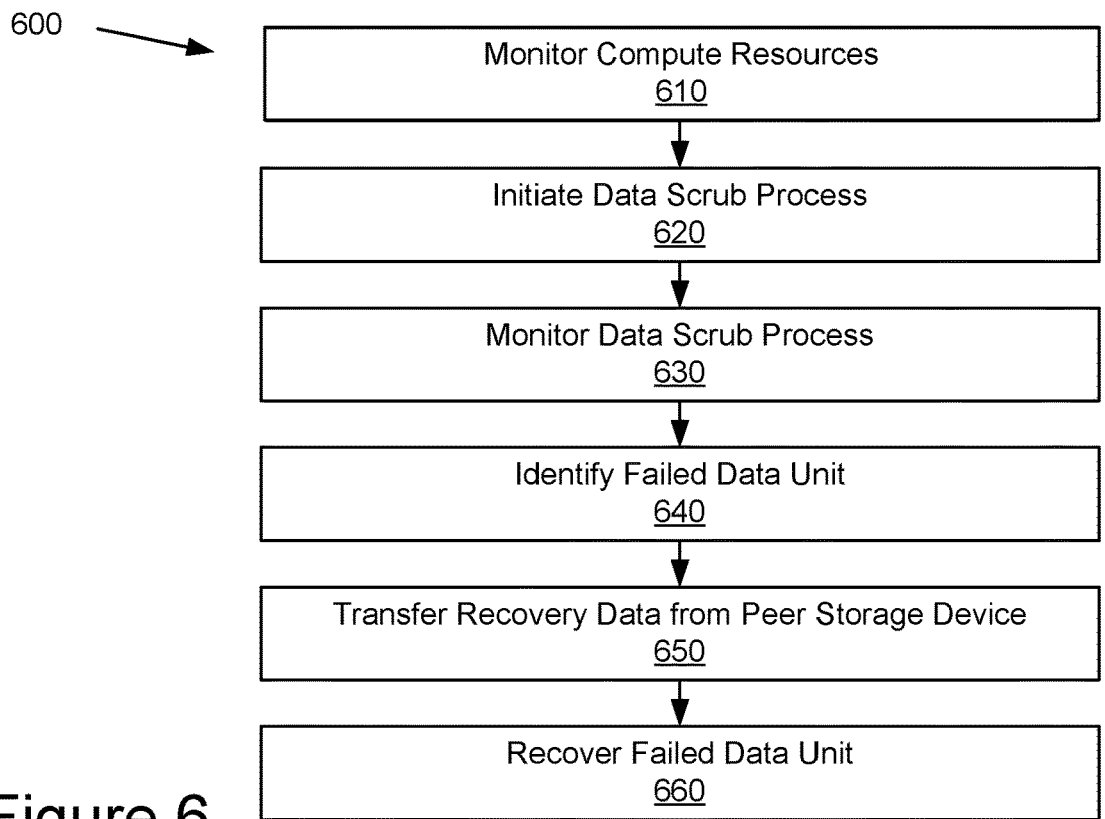
FIG. 6 illustrates an example of a method for a self-data scrub and self-healing process using a storage device.

As shown in FIG. 6, storage device 120.1 operating within data storage system 100 may be operated according to a self-data scrub process in a peer storage device configuration. For example, storage device 120.1 may provide self-data scrub and data recovery according to the method 600 illustrated by blocks 610-560 of FIG. 5.

At block 610, a storage device monitors compute resources to determine when resources are available for background tasks, such as self-data scrub. For example, self-data scrub may have a priority based on data scrub schedule and/or events related to data errors or endurance that enable the storage device to allocate compute resources to the data scrub when read/write demands are low and/or no higher priority tasks require the necessary compute resources. In some embodiments, the compute resource may be represented by one or more compute resource usage values, such as percent processor use, percent operating memory use, percent buffer use, etc. Compute resource usage values may also be measured in units other than percentages, such as operations, memory capacity, etc., and composite or calculated values based on multiple compute resources.

At block 620, a data scrub process is initiated on one or more data segments in the storage device's media devices. For example, when priority and resources align at block 610, the data scrub process is initiated based on its data scrub configuration.

At block 630, the storage device monitors the data scrub process as data scrub operations are executed against its data segments. For example, a queue of data segments forming a data scrub pattern may be identified in the data scrub configuration and the data scrub process may proceed through the queue of data segments with one or more data scrub operations to identify ECC corrections and data errors exceeding ECC correction capabilities.

At block 640, a failed data unit may be identified from the data scrub process. For example, one or more storage locations may be identified from attempted reads of the data segments as having errors. In some embodiments, storage locations with errors may identify one or more failed data units.

At block 650, recovery data corresponding to the failed data units may be transferred from peer storage devices. For example, the storage device may participate in one or more data mirroring and/or RAID groups and recovery data for the failed data units may be transferred from recovery peer storage devices using a peer data transfer.

At block 660, the failed data unit is recovered from the recovery data and stored to a new storage location. For example, the host data from the failed data unit may be received from a mirror copy and/or rebuilt from a RAID stripe or parity data. The recovered data may be stored to a different storage location on the storage device and/or offloaded to another storage device.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g. through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A storage device, comprising:
a processor;
a memory;
at least one storage medium;
an interface configured to communicate with a plurality of peer storage devices over a peer communication channel; and
a data scrub module stored in the memory and executable by the processor to perform operations comprising:
selecting a first data segment on the at least one storage medium for a data scrub process;
identifying at least one peer storage device including at least one corresponding data segment;
sending a corresponding data lock command to the at least one peer storage device over the peer communication channel;
performing a data scrub operation on the first data segment; and
generating a data scrub error report for the first data segment in response to performing the data scrub operation.

2. The storage device of claim 1, wherein the peer communication channel bypasses a storage control plane for managing the storage device.

3. The storage device of claim 1, further comprising:
a peer device registry stored in the memory and comprising:
a peer storage device identifier for each of the plurality of peer storage devices, wherein the peer storage device identifier is used to address data sent over the peer communication channel; and
a peer data configuration identifying corresponding data segments in the plurality of peer storage devices, wherein identifying at least one peer storage device including at least one corresponding data segment includes accessing the peer data configuration.

4. The storage device of claim 3, wherein:
the peer data configuration is a redundant array of independent disks (RAID) configuration;
the first data segment is a local portion of a RAID stripe; and
the at least one corresponding data segment includes at least one additional portion of the RAID stripe.

5. The storage device of claim 1, wherein the data scrub module is further executable by the processor to perform operations comprising:

storing a data scrub configuration in the memory, wherein the data scrub configuration defines a data scrub schedule and a data scrub pattern; and
initiating the data scrub process according to the data scrub schedule, wherein the first data segment is selected in response to the data scrub pattern.

6. The storage device of claim 5, wherein the data scrub module is further executable by the processor to perform operations comprising:
receiving the data scrub configuration from a data scrub manager, wherein the data scrub manager includes one of:
a peer data scrub manager instantiated in a manager peer storage device selected from the plurality of peer storage devices and communicating over the peer communication channel; and
a controller data scrub manager instantiated in a storage control plane for the plurality of peer storage devices.

7. The storage device of claim 6, wherein the data scrub process includes:
a first scrub portion performed by the data scrub manager for a first plurality of data segments on the at least one storage medium; and
a second scrub portion performed by the data scrub module for a second plurality of data segments on the at least one storage medium, wherein:
the second plurality of data segments includes the first data segment; and
the second scrub portion of the data scrub process is initiated in response to receiving the data scrub configuration from the data scrub manager.

8. The storage device of claim 1, wherein the data scrub module is further executable by the processor to perform operations comprising:
selecting a peer data segment on at least one peer storage medium for a peer data scrub process, wherein the peer storage medium is in a selected peer storage device from the plurality of peer storage devices;
performing a peer data scrub operation on the peer data segment over the peer communication channel; and
generating a peer data scrub error report for the peer data segment in response to performing the peer data scrub operation.

9. The storage device of claim 1, wherein the data scrub module is further executable by the processor to perform operations comprising:
monitoring a compute resource usage value related to the processor and the memory; and
scheduling the data scrub process in response to the compute resource usage value being below a compute resource availability threshold.

10. The storage device of claim 1, further comprising:
a self-healing module stored in the memory and executable by the processor to perform operations comprising:
identifying a failed data unit from the first data segment in response to the data scrub process;
receiving recovery data for the failed data unit from a recovery peer storage device over the peer communication channel; and
recovering the failed data unit from a first storage media segment in the at least one storage medium to a second storage media segment using the recovery data.

11. A computer-implemented method, comprising:
storing storage device identifiers for a plurality of peer storage devices in a first storage device;
establishing a peer communication channel with at least one of the plurality of peer storage devices from the first storage device, wherein the peer communication channel bypasses a storage control plane for managing the first storage device; and
executing a data scrub process comprising:
selecting a first data segment in the first storage device;
identifying at least one corresponding data segment in at least one corresponding peer storage device;
sending a corresponding data lock command to the at least one corresponding peer storage device over the peer communication channel;
performing a data scrub operation on the first data segment; and
generating a data scrub error report for the first data segment in response to performing the data scrub operation.

12. The computer-implemented method of claim 11, wherein identifying at least one corresponding data segment includes:
accessing a peer redundant array of independent disks (RAID) data configuration configured to identify corresponding data segments for the first data segment in the plurality of peer storage devices, wherein:
the first data segment is a local portion of a RAID stripe stored in the first storage device; and
the at least one corresponding data segment includes at least one additional portion of the RAID stripe.

13. The computer-implemented method of claim 11, further comprising:
storing a data scrub configuration, wherein the data scrub configuration defines a data scrub schedule and a data scrub pattern; and
initiating the data scrub process according to the data scrub schedule, wherein the first data segment is selected in response to the data scrub pattern.

14. The computer-implemented method of claim 13, further comprising:
receiving the data scrub configuration from a data scrub manager, wherein the data scrub manager includes one of:
a peer data scrub manager instantiated in a manager peer storage device selected from the plurality of peer storage devices and communicating over the peer communication channel; and
a controller data scrub manager instantiated in a storage control plane for the plurality of peer storage devices.

15. The computer-implemented method of claim 11, further comprising:
executing a peer data scrub process using the first storage device comprising:
selecting a peer data segment on at least one peer storage medium, wherein the peer storage medium is in a selected peer storage device from the plurality of peer storage devices and is not the first storage device;
performing a peer data scrub operation on the peer data segment over the peer communication channel; and
generating a peer data scrub error report for the peer data segment in response to performing the peer data scrub operation.

16. The computer-implemented method of claim 11, further comprising:
monitoring a compute resource usage value related to at least one compute resource of the first storage device; and
scheduling the data scrub process in response to the compute resource usage value being below a compute resource availability threshold.

17. The computer-implemented method of claim 11, further comprising:
identifying a failed data unit from the first data segment in response to the data scrub process;
receiving recovery data for the failed data unit from a recovery peer storage device over the peer communication channel; and
recovering the failed data unit from a first storage media segment in the first storage device to a second storage media segment using the recovery data.

18. A storage system, comprising:
a plurality of peer storage devices, wherein each of the plurality of peer storage devices comprises:
at least one storage medium;
means for storing storage device identifiers for the plurality of peer storage devices;
means for establishing a peer communication channel between a scrubbing peer storage device selected from the plurality of peer storage devices and a target peer storage device selected from the plurality of peer storage devices, wherein the peer communication channel bypasses a storage control plane for managing the plurality of peer storage devices;
means for the scrubbing peer storage device to select a first data segment in the target peer storage device;
means for identifying at least one corresponding data segment in at least one corresponding peer storage device;
means for sending a corresponding data lock command to the at least one corresponding peer storage device over the peer communication channel;
means for the scrubbing peer storage device to perform a data scrub operation on the first data segment over the peer communication channel; and
means for generating a data scrub error report for the first data segment in response to performing the data scrub operation.

19. The storage system of claim 18, further comprising:
means for managing a plurality of data scrub operations for the plurality of peer storage devices, wherein:
the means for managing the plurality of data scrub operations is configured to send a data scrub configuration to the plurality of peer storage devices; and
the data scrub configuration defines a data scrub schedule, a data scrub pattern, the scrubbing peer storage device, and the target peer storage device for each of the plurality of data scrub operations.

20. The storage system of claim 18, further comprising:
means for recovering at least one failed data unit from the first data segment using recovery data from the plurality of peer storage devices, wherein the means for recovering the at least one failed data unit is configured to:
automatically respond to the data scrub operation; and
transfer the recovery data between the peer storage devices over the peer communication channel.

* * * * *